(12) United States Patent
Zhang et al.

(10) Patent No.: US 7,970,967 B2
(45) Date of Patent: *Jun. 28, 2011

(54) TELEVISION WITH INTEGRATED ASYNCHRONOUS/SYNCHRONOUS KVMP SIGNAL SWITCH FOR CONSOLE AND PERIPHERAL DEVICES

(75) Inventors: Joseph Zhang, Chino Hills, CA (US); Victor C. Wang, Chino Hills, CA (US); Sampson Shih Shien Yang, Irvine, CA (US)

(73) Assignee: Aten Technology, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/398,943

(22) Filed: Mar. 5, 2009

(65) Prior Publication Data

US 2010/0002140 A1   Jan. 7, 2010

Related U.S. Application Data

(63) Continuation of application No. 11/956,226, filed on Dec. 13, 2007, now abandoned, which is a continuation of application No. 11/414,638, filed on Apr. 27, 2006, now Pat. No. 7,330,919, which is a continuation of application No. 10/065,375, filed on Oct. 10, 2002, now Pat. No. 6,957,287.

(60) Provisional application No. 60/338,071, filed on Nov. 9, 2001.

(51) Int. Cl.
  *G06F 13/12* (2006.01)
(52) U.S. Cl. .............................. 710/72; 710/10; 710/16

(58) Field of Classification Search .......... 710/305–317, 710/62–65, 72–73, 8–19, 36–38, 43; 345/1.1–1.3, 345/5–8, 632, 552
See application file for complete search history.

(56) References Cited

U.S. PATENT DOCUMENTS

| | | | |
|---|---|---|---|
| 6,373,500 B1 * | 4/2002 | Daniels | 345/632 |
| 6,549,966 B1 * | 4/2003 | Dickens et al. | 710/300 |
| 6,615,272 B1 | 9/2003 | Ambrose | |
| 6,671,756 B1 * | 12/2003 | Thomas et al. | 710/73 |
| 6,957,287 B2 * | 10/2005 | Lou et al. | 710/72 |
| 7,330,919 B2 * | 2/2008 | Zhang et al. | 710/72 |
| 2005/0275641 A1 * | 12/2005 | Franz | 345/204 |
| 2006/0253639 A1 * | 11/2006 | Lee et al. | 710/313 |

* cited by examiner

*Primary Examiner* — Raymond N Phan
(74) *Attorney, Agent, or Firm* — Arent Fox LLP (57) ABSTRACT

A television with integrated signal switch (100) for sharing a television screen (14), a plurality of console devices compliant with an industry standard (16, 18) and at least one peripheral devices (20) with any computer system in a plurality of computer systems (12), is provided comprising a CPU (30); a hub switch module (32) connected to the CPU (30) and configured to communicate with any of the plurality of computer systems (12), and the at least one peripheral devices (20); a device control module (38) for emulating, according to the industry standard, the plurality of console devices, connected to the CPU (30) and the hub switch (32); a host control module (44) connected to the CPU (30) and configured to communicate with the plurality of console devices (16, 18); and a video control module (50) connected to the CPU (30) and configured to communicate with the television screen (14).

17 Claims, 6 Drawing Sheets

TELEVISION WITH INTEGRATED ASYNCHRONOUS/SYNCHRONOUS KVMP SIGNAL SWITCH FOR CONSOLE AND PERIPHERAL DEVICES

CROSS-REFERENCE TO RELATED APPLICATIONS

Claim of Priority

The present application is a continuation of application Ser. No. 11/956,226, filed on Dec. 13, 2007 now abandoned, which is continuation of application Ser. No. 11/414,638, filed on Apr. 27, 2006, now U.S. Pat. No. 7,330,919, which is a continuation of application Ser. No. 10/065,375, filed Oct. 10, 2002, now U.S. Pat. No. 6,957,287, which claims priority under 35 U.S.C. §119(e) to Provisional Application No. 60/338,071, filed Nov. 9, 2001, the contents of all four of which are expressly incorporated herein by referenced as though fully set forth in full.

BACKGROUND

1. Field

The present invention relates generally to media television display devices with enhanced connectivity functionality, and more particularly, to a television with integrated signal switch for console and peripheral devices.

2. Background

A single user or multi-user Keyboard-Video-Mouse (KVM) switch system is a signal switch that allows a single user or multiple users, respectively, to share just a single keyboard, video device and mouse, or multiple sets of keyboards, video devices and mice (collectively referred to herein as "console devices"). In addition, if a peripheral device such as a Universal Serial Bus (USB) printer is connected to the switch, the peripheral device can be shared as well.

USB is a standard communications architecture and protocol that gives a computer the ability to connect to a variety of devices using a simple cable. USB utilizes a serial connection link The most current source providing information concerning the USB standard is maintained at the following site on the World Wide Web: http://www.usb.org. Available at that source is the USB Specification, the Device Class Definition for a class of devices referred to as Human Interface Devices (HID), and the USB HID Usage Supplement. The HID class consists primarily of devices that are used to control the operation of computer systems. Typical examples of HID class devices include: keyboards and cursor control (e.g., pointing) devices—for example, the standard mouse devices, standard and multimedia keyboards, trackballs, and joysticks; front-panel controls—for example, knobs, switches, buttons, and sliders; controls that might be found on devices such as telephones, video cassette recorders (VCRs), televisions, kitchen and other appliances, and remote controls; games or simulation devices—for example, data gloves, throttles, steering wheels and rudder pedals; and devices that may not require human interaction but provide data in a similar format to HID class devices—for example, barcode readers, thermometers, or voltmeters.

A signal switch that is both a KVM and a USB peripheral sharing switch allows all computers connected to the signal switch to share any USB peripheral device coupled to the signal switch without interruption of data flow to that peripheral device when the signal switch is operated to change the coupling of the console devices to different computers. This type of signal switch would also allow the switching of KVM channels and peripheral channels to a common computer or to different computers either asynchronously or synchronously.

Currently, televisions may only receive and display video input from one computer. Thus, the television may not access multiple computers to obtain content, which limits the flexibility of the configuration of the television setup. In addition, current television displays do not allow a keyboard and mouse, or similar input devices to be connected directly to the television—either wirelessly or otherwise.

SUMMARY

The present invention provides an integrated solution for media displays such as televisions to provide a variety of functions, such as: (1) obtain and display content from multiple computers; (2) operate as a computer display to allow a user to perform "work-related" tasks such as typing documents or accessing the Internet using picture-in-picture features in the television; (3) access the Internet either by an Internet connection built into the television or through one of the computer connected to it; (4) obtain and display content from various devices that can be connected to the television, such as "thumb" drives, portable hard drives, or other storage devices with Universal Serial Bus (USB) or Firewire connections; (5) record digital content delivered through other such sources as the Internet on digital recording devices connected directly to the television while simultaneously viewing the digital content; and (6) obtain and display content from networks such as a home-based broadband network.

The present invention also allows multiple user interface control devices to be coupled to the television, such as one or more keyboards, mice, remote controls, or other user interface control devices (i.e., console devices), to allow a user to communicate with a common computer at the same time. The inventive television provides multiple peripheral channels so that a variety of USB or Firewire peripherals, such as hubs, printers, scanners, cameras, etc., can be connected the television.

The present invention also provides peripherals haring functionality for the television that allows all computers connected to the television to share any peripheral device that is coupled to the television, and also allows the switching of one or more peripheral channels to a common computer or to different computers, without interruption of data flow to that peripheral when the KVM channels are switched. In one preferred embodiment, the peripheral channels may be synchronously or asynchronously switched with the KVM channels.

The switching functionality is preferably provided in the television by integrating a signal switch having KVM and peripheral device switching capabilities into the television and coupling a video output of a signal switch to one of the video input channels inside the television, and an audio output of the signal switch to one of the audio channels inside the television, and an audio output of the signal switch to one of the audio channels inside the television. Thus, a television with integrated signal switch is disclosed that is capable of sharing the television, at least one console device and at least one peripheral device with any of a plurality of computer systems. The television with integrated signal switch preferably includes switching circuitry having a central processing unit (CPU) with a first memory for storing a management program for managing the signal switch; a hub switch module connected to the CPU and configured to communicate with any of the plurality of computer systems and the at least one peripheral device, such that a signal passing from the hub switch module to the at least one peripheral device emulates signals originating from a computer; a device control module for emulating a television screen and a plurality of console devices, the device control module connected to the CPU and the hub switch module; a host control module connected to the CPU and configured to communicate with the television screen. In another preferred embodiment, part or all of the functionality described herein maybe contained in one Application Specific Integrated Circuit (ASIC).

In another preferred embodiment, the television with integrated signal switch further includes an on-screen display (OSD) control device connected to the CPU and the video control module.

In yet another preferred embodiment the host control module of the television with integrated signal switch includes a root hub, where the at least one peripheral device is USB compliant, and the at least one console device complies with an industry standard specification.

A method is also described for sharing a television screen, at least one console device compliant with an industry standard and at least one peripheral device, with any of a plurality of computer systems through a television with integrated signal switch. The preferred method including initializing the integrated signal switch; emulating the at least one console device according to the industry standard; enumerating a plurality of ports of a root hub, the plurality of ports including downstream parts; determining whether any downstream ports exist, and, if so, enumerating at least one downstream port in the plurality of ports; determining whether the at least one console device is connected to one of the root hub and the at least one downstream port, and, if so, then enumerating each connected console device; determining whether any of the connected console devices is compliant with the industry standard; enumerating each compliant connected console device and parsing any data from such compliant connected console device; and polling repeatedly to determine whether the connected console device, the at least one peripheral device, or the at least one downstream port, has been plugged or unplugged, and, if so, resetting control.

In one preferred embodiment, a management program is used for managing the integrated signal switch.

In another preferred embodiment, a television with integrated signal switch is described for sharing at least one console device and a plurality of peripheral devices with any of a plurality of computer systems. The television with integrated signal switch includes a first channel for connecting the at least one console device to a first selected computer system from the plurality of computer systems; a second channel connecting the first selected computer system to a selected peripheral device from the plurality of peripheral devices, the second channel having a data flow between the first selected computer system and the selected peripheral device; a third channel for connecting the at least one console device to a second selected computer system from the plurality of computer systems; and means for switching the at least one console device between the first channel and the third channel without interruption of the data flow through the second channel between the first selected computer system and the selected peripheral device.

Other objects, features and advantages will become apparent to those skilled in the art from the following detailed description.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

The present description is directed to a media display such as a television with an integrated signal switch for sharing one or more keyboards, mice and other such peripheral devices. In one preferred embodiment the television with integrated signal switch is created by the integration of a single switch that is a combination of a Keyboard Video-Mouse (KVM) switch and a peripheral device sharing switch into the television. The integrated signal switch allows the computers connected to the television with integrated signal switch to share the USB peripheral devices connected to the integrated signal switch.

The integrated signal switch can either asynchronously or synchronously switch KVM channels (i.e., data channels over which KVM data are communicated) and peripheral device channels (i.e., data channels over which peripheral device data are communicated), to a common computer or different computers. In other words, KVM channels and peripheral device channels may be switched together (synchronously) or separately (asynchronously).

In one preferred embodiment, the peripheral devices are devices compliant with the USB standard, and the television with integrated signal switch utilizes USB emulation programs to emulate the HID (Human Interface Devices) specification. The USB emulation enables the television with integrated signal switch to communicate with the USB ports of the computers coupled to the television. Also, through the use of USB host emulation programs, the television is able to communicate with USB devices such as USB keyboards, USB mice, and USB hubs. In other words, the use of emulation allows the television with integrated signal switch to appear as a computer to peripheral devices while appearing as peripheral devices to computers coupled to the television with integrated signal switch. It also enables the television with integrated signal switch to communicate with USB devices or computers simultaneously.

Although one preferred embodiment is described with reference to the current USB HID specification, it will be apparent to those skilled in the art with reference to this disclosure that the television with integrated signal switch may be implemented with any specification for device interfacing.

Figure 1:
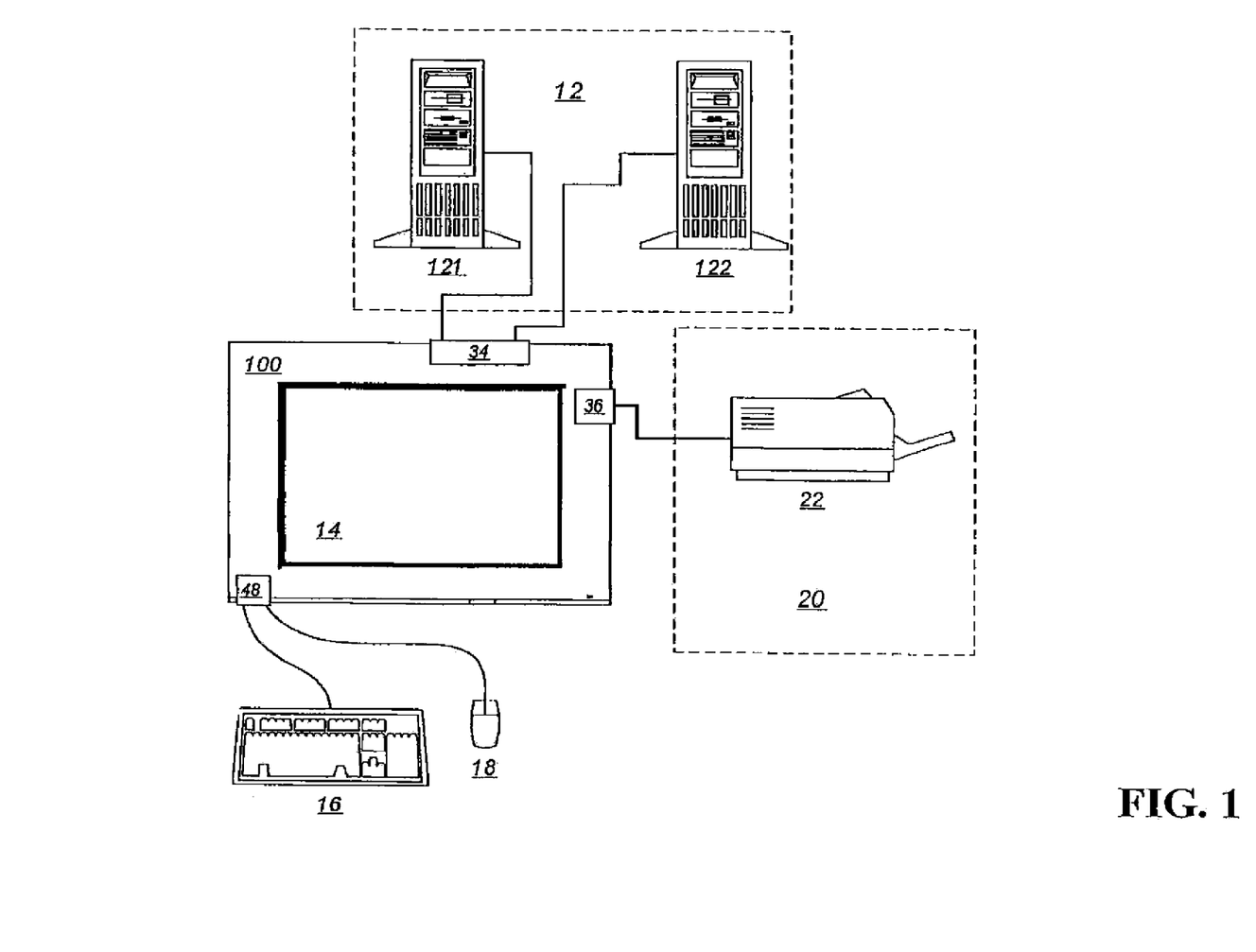
FIG. 1 is a system diagram of one possible use of a television with integrated signal switch configured in accordance with one preferred embodiment.

FIG. 1 illustrates one of the many ways in which the present invention may be used. In a simple configuration, a television with an integrated signal switch 100 configured in accordance with one preferred embodiment of the present invention permits a user to control a plurality of computer systems 12 (represented by a first computer 121 and second computer 122), and a plurality of USB compatible peripherals 20 (represented by a first printer 22) with a television screen 14, first keyboard 16, and a first mouse 18. In this example, control of the peripheral, first printer 22, can be maintained by first computer 121 even while television screen 14, first keyboard 16 and first mouse 18 are used to operate second computer 122. This is because television with integrated signal switch 100 can switch between: (1) a first channel (e.g., a first KVM channel) connecting television screen 14, first keyboard 16 and first mouse 18 to first computer 121 and a third channel (e.g., another KVM channel) connecting television screen 14, first keyboard 16 and first mouse 18 to second computer 122, while maintaining a second channel (e.g., a peripheral channel) connecting first computer 121 to first printer 22 such that a first data flow between first computer 121 and first printer 22 is not interrupted. In addition, a sound channel may be switched with the KVM channels or independently.

Figure 2:
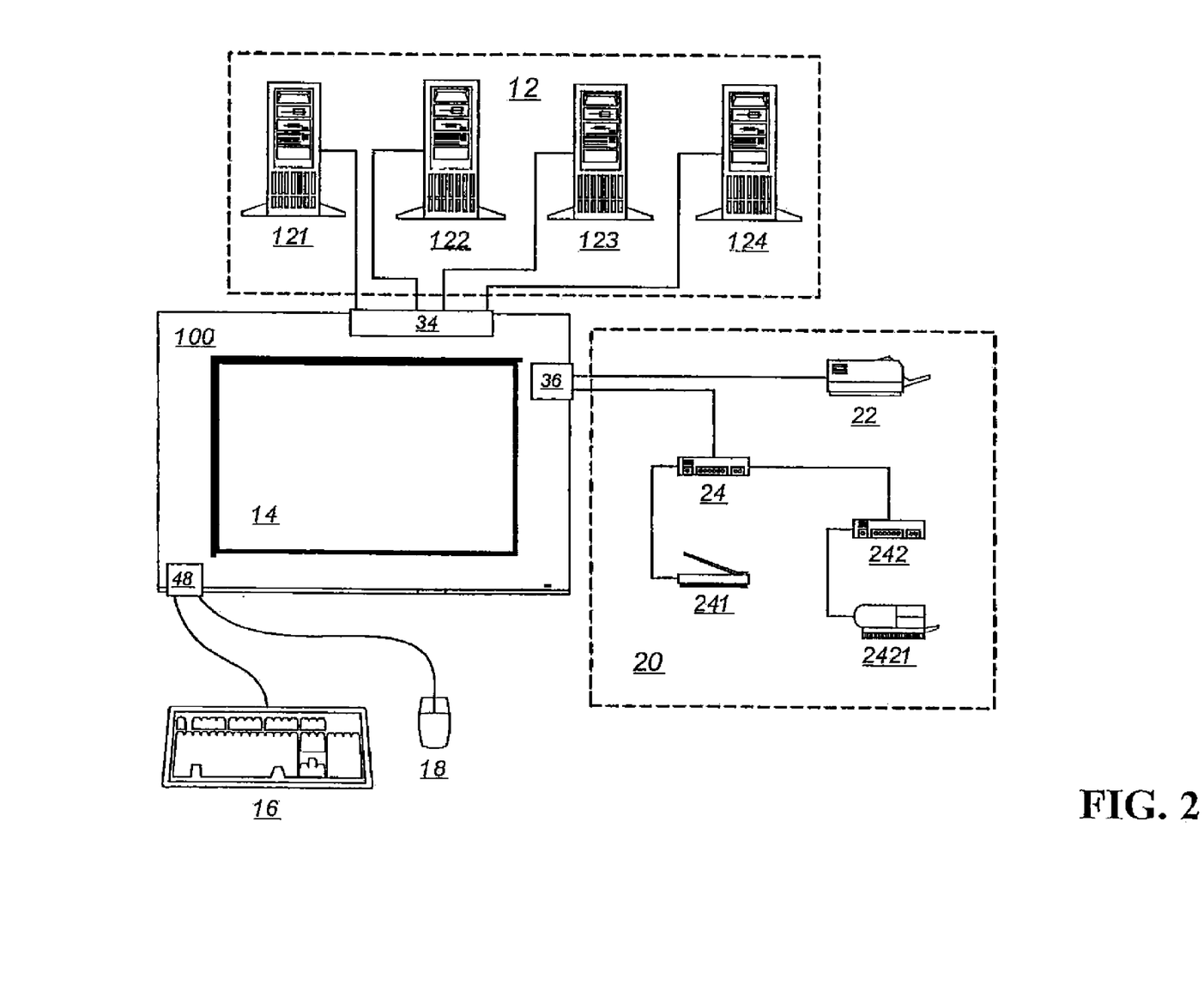
FIG. 2 is a system diagram of another possible use of the television with integrated signal switch.

With reference to FIG. 2, a more robust use of the present invention is shown, permitting a user to control the plurality of computer systems (represented by first computer 121, second computer 122, a third computer 123, and a fourth computer 124), and plurality of USB compatible peripherals 20 with television screen 14, first keyboard 16, and first mouse 18. Note that it is possible to have a plurality of USB hubs 24 also connected to television with integrated signal switch 100, which in turn can connect to peripherals such as a scanner 241, or one or more downstream hubs such as a downstream hub 242, which in turn may be connected to one or more peripherals such as a second printer 2421. It thus can be seen that a "tree" of hubs/peripherals can be connected to television with integrated signal switch 100 and thus controlled synchronously or asynchronously by one or more computers in plurality of computer systems 12 under the management of television screen 14, first keyboard 16, and first mouse 18.

For example, a first data flow between first computer 121 and first printer 22, a second data flow between third computer 123 and scanner 241, and a third data flow between fourth computer 124 and second printer 2421 all could be maintained without interruption while keyboard 16 and mouse 18, and optionally television screen 14, are switched among the computers in plurality of computer systems 12.

Peripheral devices that can be connected with the present invention include but are not limited to USB compliant devices such as USB hubs, printers, scanners and cameras.

Figure 3:
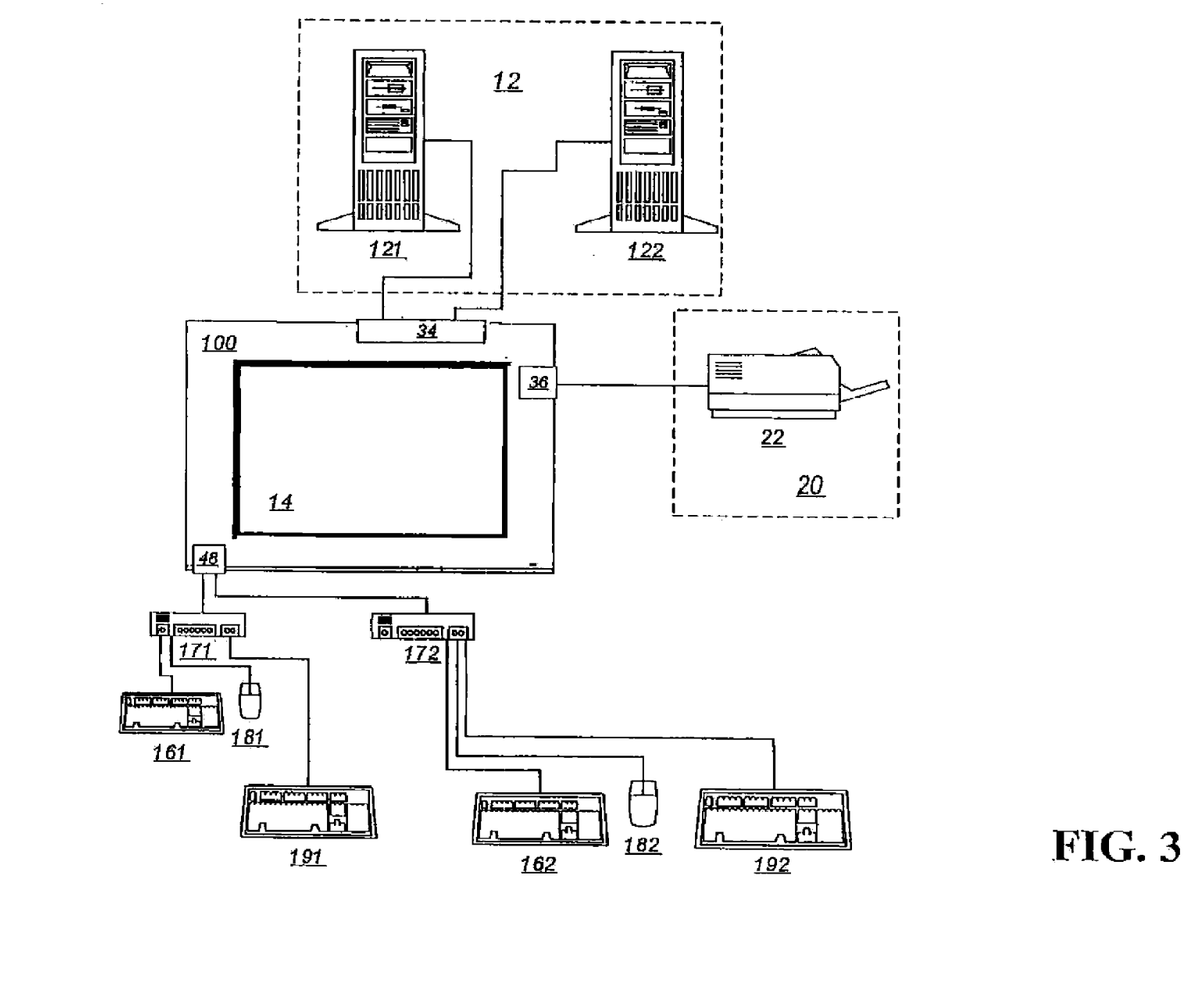
FIG. 3 is a system diagram of another possible use of the television with integrated signal switch.

With reference to FIG. 3, in a still further use of the present invention, by way of example it is possible to connect multiple keyboard and mouse devices such as a second keyboard 161, a third keyboard 162, a second mouse 181, a third mouse 182, a first composite keyboard/mouse device 191 and a second composite keyboard/mouse device 192 to television with integrated signal switch 100. In one preferred embodiment, television 100 only has two USB console ports, and, to connect more than two devices, one or more downstream hubs must be connected, such as a first downstream hub 171 and a second downstream hub 172, to which may be connected one or more other keyboard, mouse or other console devices.

Figure 4:
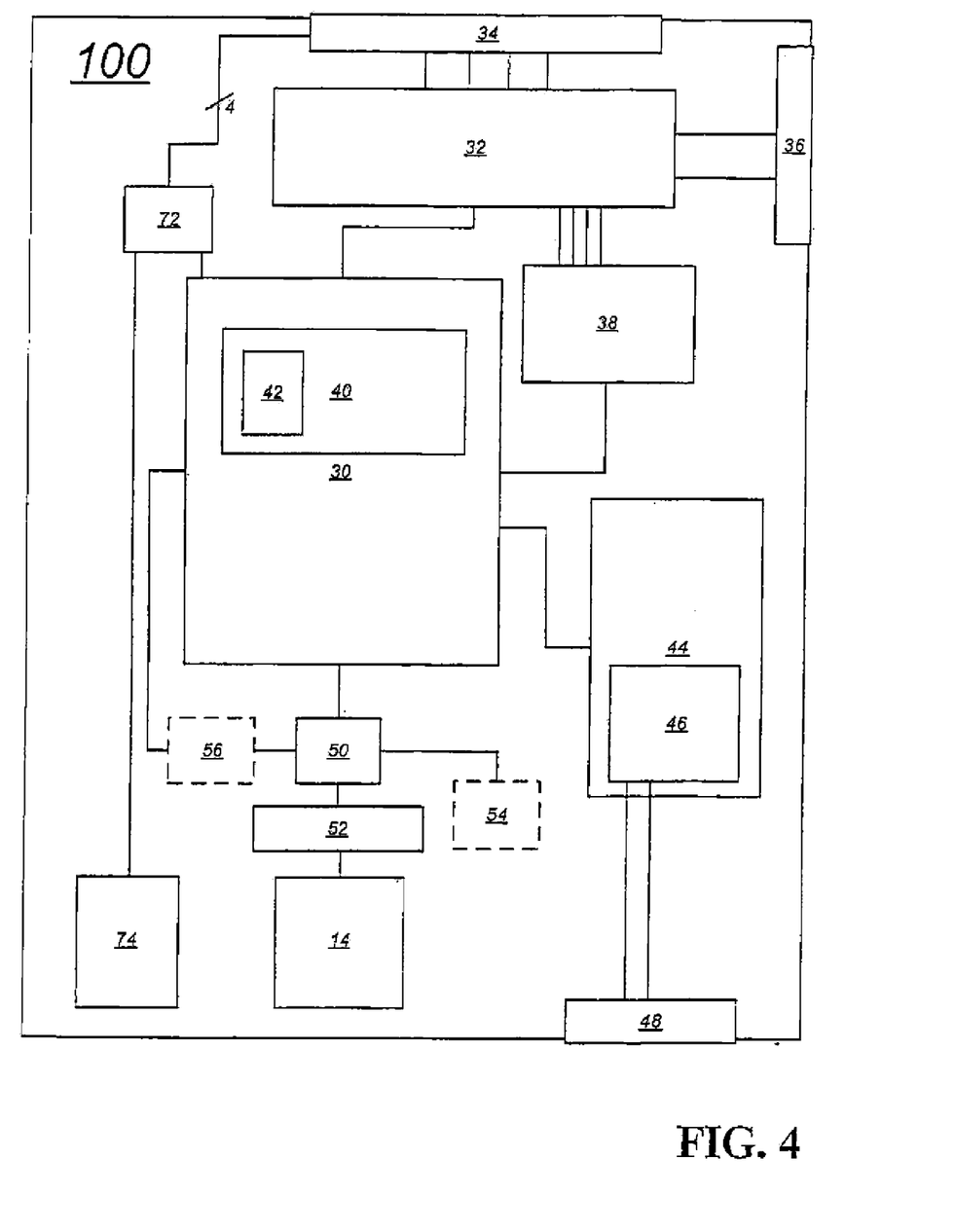
FIG. 4 is a block diagram of the television with integrated signal switch.

With reference to FIG. 4, television with integrated signal switch 100 includes a CPU 30 for managing the signal switching functionality of television with integrated signal switch 100. A USB hub switch module 32 is connected to CPU 30 and is configured to communicate with the computers in plurality of computer systems 12 through a first plurality of input/output ports 34. An audio switch 72 is also coupled to the computers in plurality of computer systems 12 through plurality of input/output ports 34. As described further below, audio switch 72 is coupled to the audio ports of the computers in plurality of computer systems 12 to provide audio switching capability to television with integrated signal switch 100.

USB hub switch module 32 is also configured to communicate with plurality of peripheral devices 20 through a second plurality of output ports 36. In FIG. 4, four connections are shown between first plurality of input/output ports 34 and USB hub switch module 32, and four connections are shown between first plurality of input/output ports 34 and audio switch 72, but these are by way of example only. The number of connections will equal the number of computers in plurality of computer systems 12 with which the television with integrated signal switch 100 is designed to interoperate. Likewise, in FIG. 4, two connections are shown between a second plurality of output ports 36 and USB hub switch module 32, but this is also by way of example only. The number of connections will equal the number of peripheral output ports with which television with integrated signal switch 100 is designed to interoperate.

Audio switch 72 is coupled to an audio circuit 74 of television with integrated signal switch 100. Audio circuit 74 includes audio circuitry normally found on a television set, and may include pre-amplifiers, switches, amplifiers, speakers and/or microphones. Audio switch 72 is also coupled to and controlled by CPU 30. Audio switch 72 provides the routing of the audio signals received from the computers in plurality of computer systems 12 to audio circuit 74 such that audio from any of the computers in plurality of computer systems 12 may be coupled to audio circuit 74. For example, in one preferred embodiment, first computer 121 and second computer 122 contain each contains a computer sound card that allows the computer to generate sound through a speaker plugged into the sound card, or record sound through a microphone plugged into the sound card. Instead of directly being coupled to a speaker, the sound inputs/outputs of first computer 121 and second computer 122 may be connected to television with integrated switch 100 through audio switch 72. Sound is then output and/or input to first computer 121 and second computer 122 from any speakers and/or microphones, respectively, coupled to television with integrated switch 100. For example, audio switch 72 can be switched to couple the sound output/input of first computer 121 to audio circuit 74. In another example, audio switch 72 can also be switched to couple the sound output/input of second computer 121 to audio circuit 74. In yet another example, audio switch 72 can be switched to couple the sound output of first computer 121 and the sound input of second computer 122 to audio circuit 74.

USB hub switch module 32 is a bridge between plurality of peripheral devices 20 and plurality of computer systems 12 and allows television with integrated signal switch 100 to connect each computer system of plurality of computer systems 12 to one or more peripheral devices. In one preferred embodiment, USB hub switch module 32 includes 4 USB hubs and matrix analog switches that are controlled by firmware for CPU 30. As an example, Texas Instruments® manufactures USB Hub chips that are suitable for this module, and the module can be constructed using Application Specific Integrated Circuit (ASIC) design methodology.

A USB device control module 38 for controlling signals is connected to CPU 30 and USB HUB switch module 32. USB device control module 38 comprises USB device emulation circuitry that is used to emulate various console devices, such as first keyboard 16 and first mouse 18, for first plurality of input/output ports 34. In other words, for example, by having USB device emulation circuitry that emulates virtual console devices that are attached to first computer 121, actual console devices (e.g., first keyboard 16 and first mouse 18) may be switched to second computer 122 or other computers, leaving any channels between first computer 121 and peripherals connected. Thus, any data flow in such channels remain uninterrupted, with first computer 121 still processing as if the actual console devices, now emulated, were still connected. The USB device emulation circuitry is controlled by the firmware for CPU 30. In one preferred embodiment, the USB device emulation circuitry is in the form of a computer chip and one chip is used for each computer in plurality of computer systems 12.

In FIG. 4, four connections are shown between USB device control module 38 and USB hub switch module 32, but this is by way of example only. The number of connections will equal the number of computers in plurality of computer systems 12 with which television with integrated signal switch 100 is designed to interoperate. In one preferred embodiment, USB device control module 38 includes USB device emulation circuitry for four (4) devices and the USB device emulation circuitry is also controlled by the firmware for CPU 30. As an example, Philips Semiconductors® makes chips suitable for use in this module, and the module may also be constructed using Application Specific Integrated Circuit (ASIC) design methodology.

Figure 5:
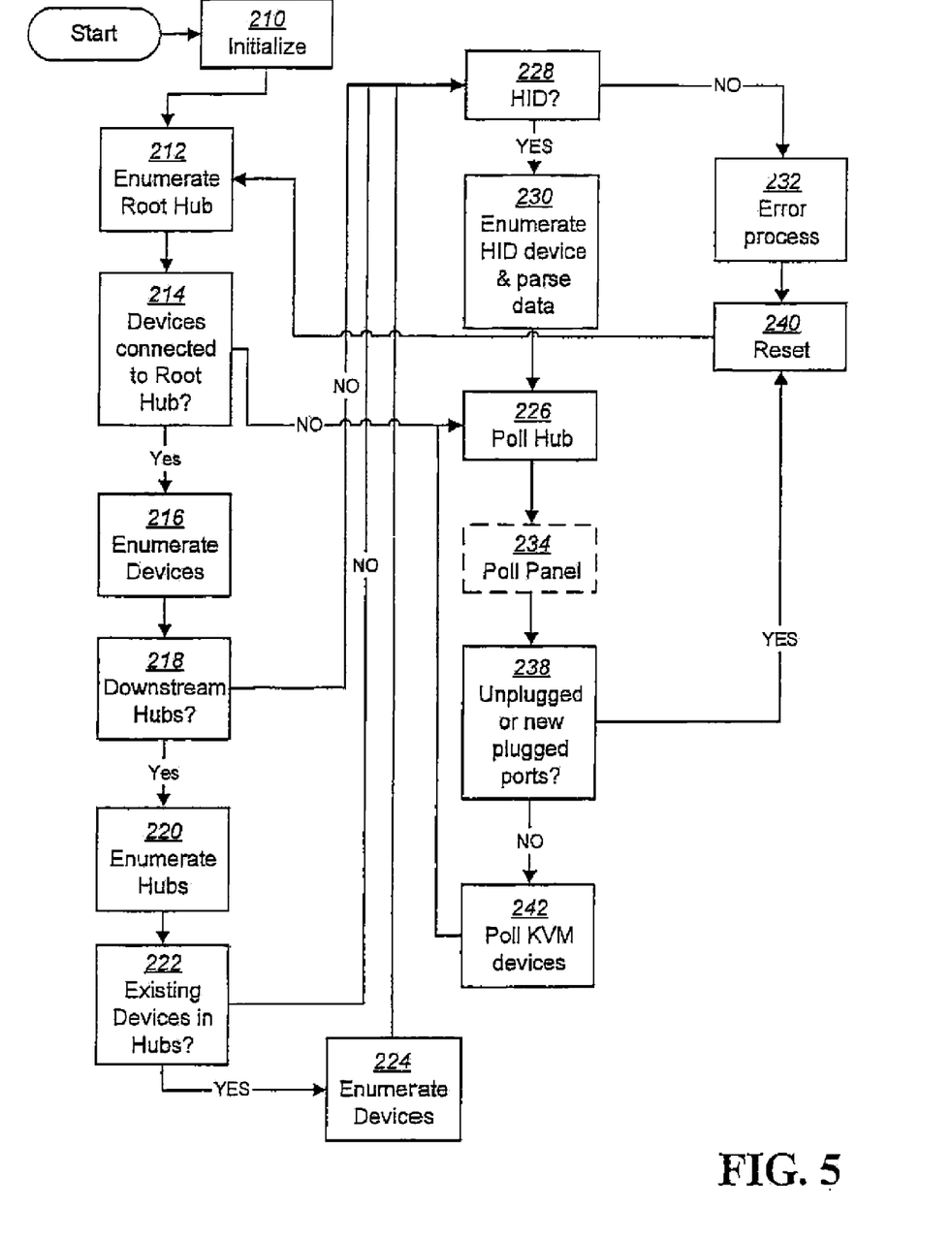
FIG. 5 is a flow chart of a process useable in a management control program for the television with integrated signal switch; and, FIG. 6 is a block diagram of a computer system that may be used with the television with integrated signal switch.

In one preferred embodiment, CPU 30 comprises a first memory 40 for storing a management program 42 for managing the operation of television with integrated signal switch 100. A flowchart of the operation of a portion of management program 42 suitable for use in television with integrated signal switch 100 is illustrated in FIG. 5 and described below.

A USB host control module 44 is configured to communicate with a plurality of console devices and is connected to CPU 30. USB host control module 44 itself comprises a root hub 46 for communicating with one or more console devices or downstream hubs through a third plurality of output ports 48. Root hub 46 is a USB compatible hub.

As shown in FIG. 3, one or more downstream hubs may be connected to television with integrated the signal switch 100, such as first downstream hub 171 and second downstream hub 172, communicating with root hub 46 through one of the ports in third plurality of output ports 48. In one preferred embodiment, it is possible to daisy chain up to 127 devices by adding additional downstream hubs.

In one preferred embodiment, third plurality of output ports 48 comprise two physical ports. Optionally, in a different preferred embodiment, an internal additional console USB hub (not shown) may be connected to root hub 46 to increase the number of third plurality of output ports 48 available for connecting console devices. In addition, the firmware for CPU 30 has the ability to handle hub functions.

A video/panel control device module 50 is connected to CPU 30 for communicating with a variety of optional panel display devices 54 (shown in broken lines), such as light panels, LEDs, buttons, video controller switches, or other optional panel devices. If an on screen display ("OSD") function is provided, then an optional OSD control device module 56 (shown in broken lines) is connected to CPU 30 and video/panel control device module 50 for controlling and adjusting signals to television screen 14 through a fourth output port 52 coupled to television screen 14. In one preferred embodiment, television with integrated signal switch 100 is capable of providing a picture in picture (PIP) display on television screen 14. For example, the PIP display may be comprised of a first frame displaying content received from a standard television content source such as an antenna, Cable, or satellite disk, and a second frame, superimposed on the first frame, displaying content received from one of the computer systems of the plurality of computer systems 12 through television with integrated signal switch 100. The superimposition may be reversed, or the frames may be displayed next to each other. In another example, the frames may display content received from a different computer systems. More than two frames may be displayed on television screen 14, each receiving and displaying content from a different source (e.g., one of the computer systems of the plurality of computer systems 12 and/or the standard television content source).

With reference to FIG. 5, the operation of a portion of a management program 42 suitable for use in the present invention is described as follows. In step 210, television with integrated signal switch 100 is initialized. In step 212, root hub 46 is enumerated and any root hub message from root hub 46 is saved. In step 214 it is determined whether any device is connected to root hub 46. If a device is determined to be connected to root hub 46, operation continues with step 216, otherwise operation continues with step 226.

In step 216, each device that is determined to be connected to root hub 46 is enumerated, and a device message from each USB device determined to be connected to root hub 46 is parsed and saved in a suitable memory.

Next, in step 218, it is determined whether any downstream hub is connected to root hub 46. If no downstream hub is determined to be connected to root hub 46, operation proceeds with step 228. If a downstream hub is detected, operation proceeds with step 220. In step 220, each downstream hub determined to be connected to root hub 46 is enumerated and a downstream port status of the hub is received. Operation then proceeds with step 222.

In step 222, it is determined whether any device exists in a port of a downstream hub. If no device is determined to exist in a port of a downstream hub, operation proceeds with step 228. If, in step 222, a device is determined to exist in a port of downstream hub, operation process with step 224, where each such device is enumerated and a connecting device message is parsed and saved in memory of the host. Operation then proceeds with step 228.

In step 228, it is determined whether the connected device is a HID keyboard or mouse or other HID compliant device. As will be evident to those skilled in the art with reference to this disclosure, this step could test for compliance with any desired industry standard or device class (e.g., the USB HID device class). If the connected device is not such a device, operation proceeds with step 232, which is an error process that results in resetting USB host control module 44 in step 240. If the connected device is determined to be compliant, then, in step 230, each such connected device is enumerated and its report data is parsed. In one preferred embodiment, the requirement for the compliance test is that television with integrated signal switch 100 has been constructed to only emulate certain console devices that comply with an industry standard device class.

Operation then continues with step 226, where HUB switch module 32 is polled. In optional step 234, any panel or LED circuit is polled. In step 238, it is determined whether any downstream ports are unplugged or plugged. If a downstream port is unplugged or plugged, operation proceeds with step 240, where the HOST control RAM is reset. After resetting the HOST control RAM in step 240, operation returns to step 212. Otherwise, operation proceeds with step 242, where all KVM devices are polled and operation returns to step 234.

In one preferred embodiment, CPU 30 controls USB and console device emulation. However, it is not necessary for CPU 30 to control the USB peripherals, since there is a path or channel between the USB peripherals and respective computers in plurality of computer systems 12 that is undisturbed by switching the channels between the keyboard and mouse devices and respective computers in plurality of computer systems 12.

The HID specification defines a quasi-language for the HID-compliant USB device to inform the host how to interpret the data that the host receives. This quasi-language is flexible and permits many alternatives for describing the same functionality. Television with integrated signal switch 100 will be useable with other industry standard specifications that define procedures that allow a host to interpret the data that the host receives from a device compliant with these industry standards.

An exemplary Device Class Definition for Human Interface Devices (HID) Firmware Specification-6/27/01, Version 1.11, is available at http://www.usb.org/developers/docs/ and is incorporated herein. The most current version of the specification and other HID related information is maintained at http://www.usb.org/.

Using a bus analyzer, such as one available currently from Computer Access Technology Corp., it is possible to read the USB bus and analyze the data packets coming from a keyboard and a mouse. The HID specification provides interpretation of the meaning of each packet. By requiring that all console devices be compliant with the HID specification, or some future standard specification, it will only be necessary to emulate such HID or standards-compliant devices.

In one preferred embodiment as noted herein, the programs to be used in the system, which include the USB hub switch control program, the USB device emulation circuitry (i.e. device emulation) control program, and the console device emulation (i.e., Host emulation) program, are all built in CPU 30 (e.g. as a Flash Read Only Memory (ROM), or Programmable ROM (PROM)). Thus, the USB emulation program will make television with integrated signal switch 100 appear as a computer to peripheral devices, and enable television with integrated signal switch 100 to communicate with USB devices or computers at the same time.

Figure 6:
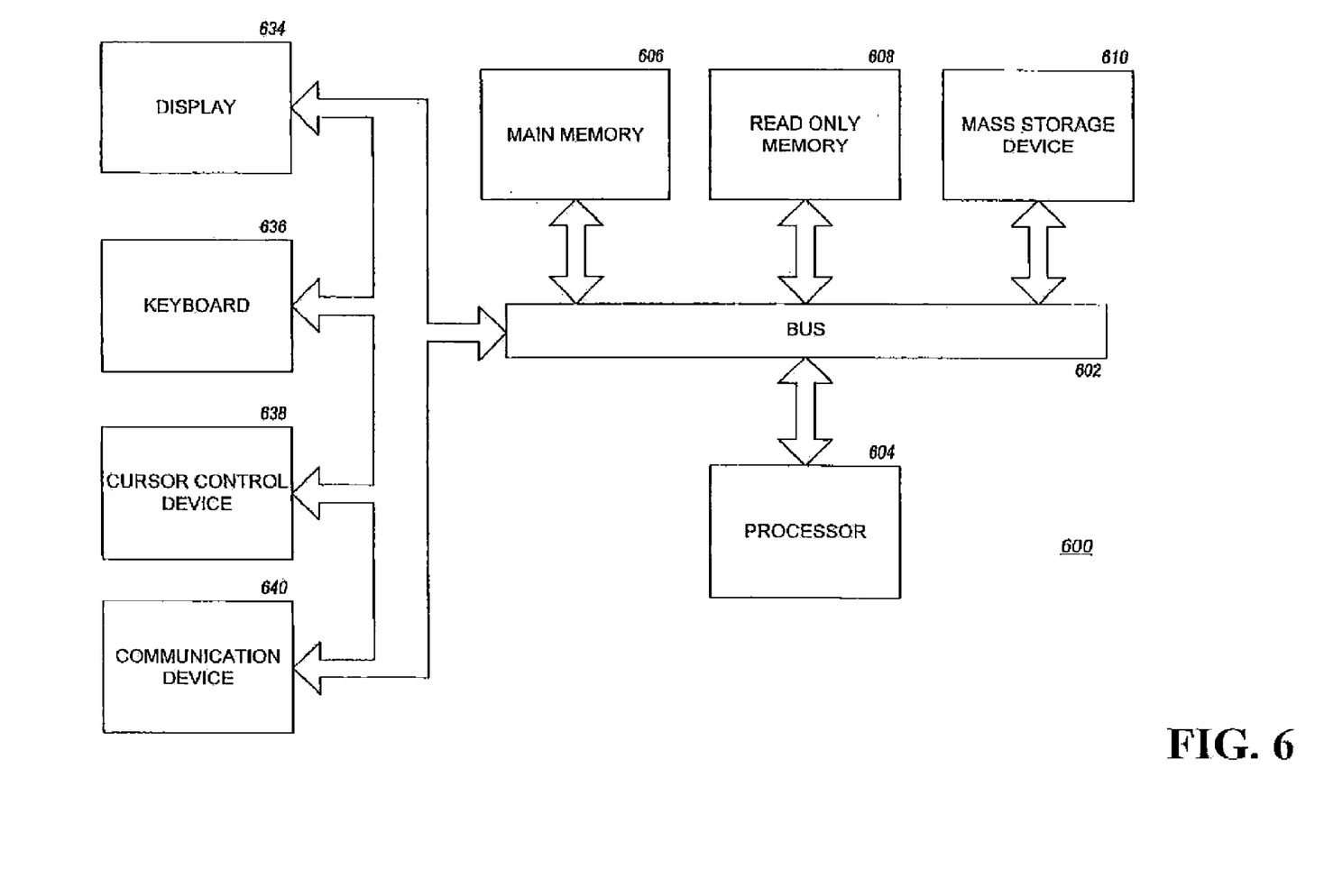

FIG. 6 illustrates an example of a computer system 600 in which the features of the present invention may be implemented. In one preferred embodiment, each of the computers in plurality of computer systems 12 has some or all of the characteristics of computer system 600. Computer system 600 includes a bus 602 for communicating information between the components in computer system 600, and a processor 604 coupled with bus 602 for executing software code, or instructions, and processing information. Computer system 600 further comprises a main memory 606, which may be implemented using random access memory (RAM) and/or other random memory storage device, coupled to bus 602 for storing information and instructions to be executed by processor 604. Main memory 606 also may be used for storing temporary variables or other intermediate information during execution of instructions by processor 604. Computer system 600 also includes a read only memory (ROM) 608 and/or other static storage device coupled to bus 602 for storing static information and instructions for processor 604. Further, a mass storage device 610, such as a magnetic disk drive and/or a optical disk drive, may be coupled to computer system 600 for storing information and instructions.

Computer system 600 is typically coupled via bus 602 to a display device 634, such as a cathode ray tube (CRT) or a liquid crystal display (LCD), for displaying information to a user so that, for example, graphical or textual information may be presented to the user on display device 634. In one preferred embodiment, instead of being coupled to display device 634, computer system 600 is coupled to television with integrated signal switch 100 as described above. Typically, an alphanumeric input device 636, including alphanumeric and other keys, is coupled to bus 602 for communicating information and/or user commands to processor 604. Another type of user input device shown in the figure is a cursor control device 638, such as a conventional mouse, touch mouse, trackball, track pad or other type of cursor direction key for communicating direction information and command selection to processor 604 and for controlling movement of a cursor on display 634. Various types of input devices, including, but not limited to, the input devices described herein unless otherwise noted, allow the user to provide command or input to computer system 600. For example, in the various descriptions contained herein, reference may be made to a user "selecting," "clicking," or "inputting," and any grammatical variations thereof, one or more items in a user interface. These should be understood to mean that the user is using one or more input devices to accomplish the input. Although not illustrated, computer system 600 may optionally, include such devices as a video camera, speakers, a sound card, or many other conventional computer peripheral options. In one preferred embodiment, the various types of input devices are the ones coupled to television with integrated signal switch 100 and, also through such connection, communicate with computer system 600.

A communication device 640 is also coupled to bus 602 for accessing other computer systems, as described below. Communication device 640 may include a modem, a network interface card, or other well-known interface devices, such as those used for interfacing with Ethernet, Token-ring, or other types of networks, including the Internet. In this manner, computer system 600 may be coupled to a number of other computer systems.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. It should be appreciated that the present invention should not be construed as limited by such embodiments, but rather construed according to the below claims.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, e.g., in a Liquid Crystal Display (LCD)-based displays or televisions; Cathode Ray Tube (CRT)-based displays or televisions; or plasma-based displays or televisions, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments. Accordingly, the present invention is to be defined solely by the scope of the following claims.

What is claimed is:

1. A television for sharing a television screen, a plurality of console devices compliant with an industry standard, and at least one peripheral device with any computer in a plurality of computer systems, comprising:
    a central processing unit (CPU);
    a hub switch module coupled to the CPU and configured to communicate with any computer system in the plurality of computer systems and the at least one peripheral device for coupling the at least one peripheral device and any computer system in the plurality of computer systems, such that a signal passing from the hub switch module to the at least one peripheral device emulates origination from a computer;
    a host control module coupled to the CPU and configured to communicate with the plurality of console devices; and
    a video control module coupled to the CPU and configured to communicate with the television screen;
    wherein the plurality of console devices can be switched either synchronously or asynchronously with the at least one peripheral device to a same or different ones of the plurality of the computer systems without interruption of the signal to the one or more than one peripheral device.

2. The television of claim 1, wherein the CPU comprising a first memory for storing a management program for managing the television with integrated signal switch.

3. The television of claim 1, wherein the television further comprises an audio circuit and an audio switch coupled to the CPU and configured to communicate with at least one computer system in the plurality of computer systems to selectively receive and route audio signals between the at least one computer system and the audio circuit.

4. The television of claim 1, wherein the video control module is coupled to the plurality of computer systems and configured to cause the television screen to display, in a first frame, content received from a first computer system in the plurality of computer systems, and, in a second frame, content received from a second computer system in the plurality of computer systems.

5. The television of claim 1, wherein the video control module is coupled to the plurality of computer systems and configured to cause the television screen to display, in a first frame, content received from a first computer system in the plurality of computer systems, and, in a second frame, content received from another source.

6. The television of claim 1, wherein a first console devices is coupled to the host control module, the at least one peripheral device is coupled to a first computer system in the plurality of computer systems, and the first console device is switchable between the first computer system and a second computer system in the plurality of computer systems without interrupting the coupling of the at least one peripheral device to the first computer system.

7. The television of claim 1, further comprising a device control module coupled to the CPU and the hub switch module for emulating, according to the industry standard, the plurality of console devices.

8. The television of claim 1, further comprising an On Screen Display (OS) control device coupled to the CPU and the video control module.

9. The television of claim 1, wherein the host control module comprises a root hub.

10. A method for creating a device for sharing a display, a plurality of console devices compliant with an industry standard and at least one peripheral device with any of a plurality of computer systems, comprising:
    providing a television comprising a television screen; and,
    integrating a video switch with the television, the video switch comprising:
        a central processing unit (CPU);
        a hub switch module coupled to the CPU and configured to communicate with any computer system in the plurality of computer systems and the at least one peripheral device for coupling the at least one peripheral device and any computer system in the plurality of computer systems, such that a signal passing from the hub switch module to the at least one peripheral device emulates origination from a computer;
        a host control module coupled to the CPU and configured to communicate with the plurality of console devices; and
        a video control module coupled to the CPU and configured to communicate with the television screen;
    wherein the plurality of console devices can be switched either synchronously or asynchronously with the at least one peripheral device to a same or different ones of the plurality of the computer systems without interruption of the signal to the one or more than one peripheral device.

11. The method of claim 10, wherein the CPU comprising a first memory for storing a management program for managing the television with integrated signal switch.

12. The method of claim 10, wherein the video control module is coupled to the plurality of computer systems and configured to cause the television screen to display, in a first frame, content received from a first computer system in the plurality of computer systems, and, in a second frame, content received from a second computer system in the plurality of computer systems.

13. The method of claim 10, wherein the video control module is coupled to the plurality of computer systems and configured to cause the television screen to display, in a first frame, content received from a first computer system in the plurality of computer systems, and, in a second frame, content received from another source.

14. The method of claim 10, wherein a first console devices is coupled to the host control module, the at least one peripheral device is coupled to a first computer system in the plurality of computer systems, and the first console device is switchable between the first computer system and a second computer system in the plurality of computer systems without interrupting the coupling of the at least one peripheral device to the first computer system.

15. The method of claim 10, further comprising a device control module coupled to the CPU and the hub switch module for emulating, according to the industry standard, the plurality of console devices.

16. The method of claim 10, further comprises an On Screen Display (OSD) control device coupled to the CPU and the video control module.

17. The method of claim 10, wherein the host control module comprises a root hub.

* * * * *